March 6, 1962  E. L. GORENTY  3,023,532
BITE SIGNAL FOR NIGHT FISHING
Filed July 22, 1959
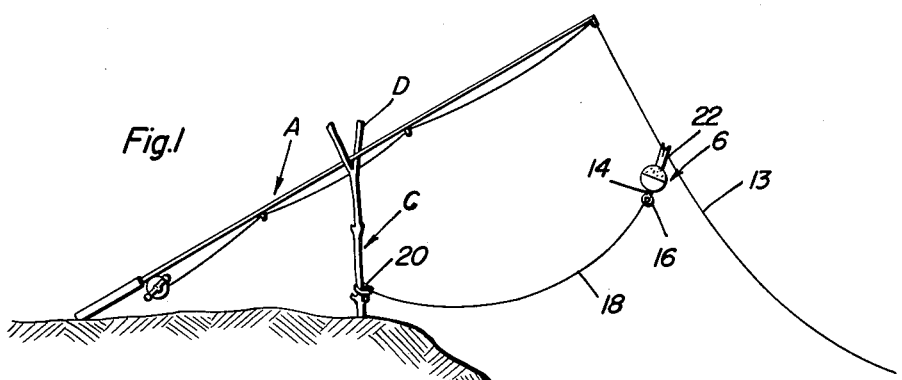
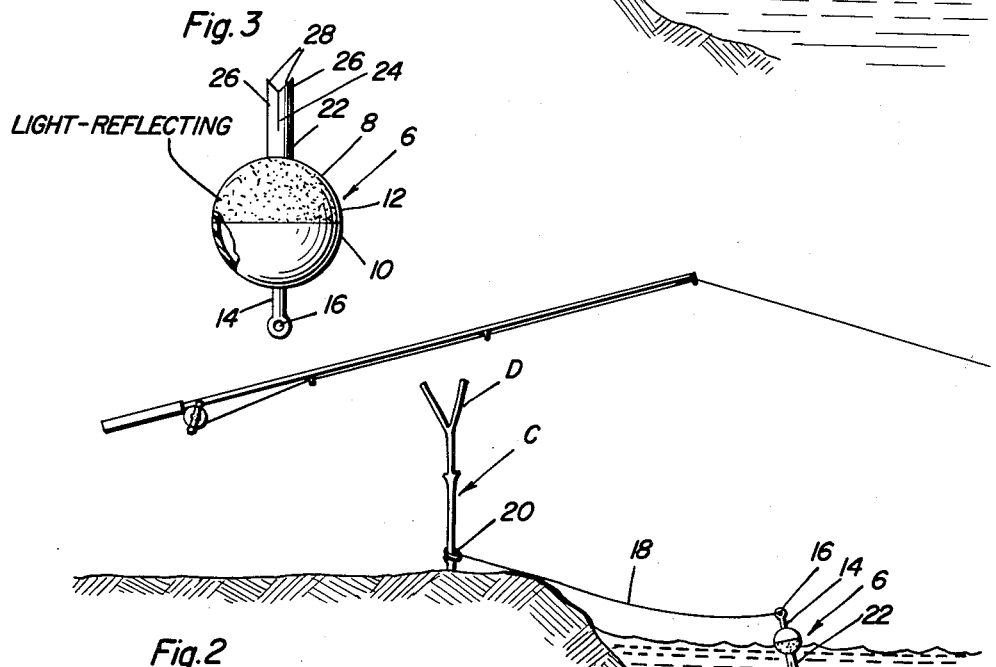
Earl L. Gorenty
INVENTOR.

3,023,532
BITE SIGNAL FOR NIGHT FISHING
Earl L. Gorenty, Shade St., Middleport, Pa.
Filed July 22, 1959, Ser. No. 828,771
1 Claim. (Cl. 43—17)

This invention relates to a bite indicating signal which is suitably and desirably constructed for use in connection with a baited fishing line, and the obvious purpose of the invention is to greatly assist the night fisherman in observing that an attempted strike has been undertaken by the fish and that action by the fisherman is necessary to assure a successful landing of the fish.

Buoyant signals and indicators are well known and are in use daily by anglers. Primarily these accessories are referred to either as floats or bobbers and the purpose of the same which when fixed above the hook is to warn of a fish's presence. They are made of a variety of materials, cork and plastic being the most common. This information is given here because the present concept has to do with a bobber or float which is unique and an innovation by reason of the fact that it has reflective surfaces and also novel line accommodating devices as will be explained.

In carrying out the concept hereinafter specifically revealed a simple ball-like or equivalent bobber is involved. More particularly, the bobber comprises a hollow float made up of hemispherical half-sections preferably of distinguishable colors, say red and white. What is significant, however, is the fact that the exterior surface of either one or both of the halves may be coated with light reflective material.

It will be evident that the object of the invention is therefore to provide a light reflecting float which may be attached to the fishing line within the range of the offshore lantern, flashlight or other source of illumination which the fisherman has on the bank. The light rays reflected from the float surfaces constitute a ways and means to attract fish to the line. It follows that when the bait is taken and since the bobber or float is attached in a novel way to the line, the float comes into play to inform the angler that either the hook has been taken or the bait is being nibbled at.

The preferred embodiment of the invention is that shown and which is characterized by the aforementioned colored and reflective float or bobber wherein the same is provided on one side with a shank with an eye to which a retrieving and captive line is connected, and is provided on a diametrically opposite side with an outstanding prong or stem which is formed with a clothespin-like grip which is releasably connected with a fishing line.

Objects, features and advantages in addition to those touched upon will become apparent from the following description and the accompanying drawing.

In the drawing, wherein like numerals are employed to designate like parts throughout the views:

FIG. 1 is a view in side elevation showing the improved float or bobber and how it is constructed and used;

FIG. 2 is a view based on a similar illustration but showing the rod being lifted from the shore prop or stake and illustrating the grip means on the bobber released from the fishing line; and FIG. 3 is a view in detail of the float or bobber by itself with a portion broken away and appearing in section.

As FIGS. 1 and 2 of the drawing show, it is an objective in the instant matter to think of the invention as tied in with unattended fishing procedure. In other words, this invention adds to the acceptability of unattended fishing because it is not necessary for the fisherman to sit by the pole or rod and strain his eyes watching line in the hopes that he may detect a bite. The fishing rod is denoted at A and is conventional and the fishing line B which is cooperable therewith and with a reel is conventional. As a matter of fact, any suitable shore or land stake or support may be provided. The one shown is denoted at C and is vertically anchored in the bank and has a fork D at the upper end providing a crotch in which the median portion of a fishing rod A is releasably seated, allowing the rod to be angled in a position for readiness of use in the manner shown and also well known.

The invention itself is primarily directed to the novel and improved signaling float or bobber. This is denoted generally by the numeral 6. As already mentioned it is of any suitable buoyant material and shape. Satisfaction has been had from the use of a more or less common ball-like bobber of hollow plastic form and which is characterized by upper and lower hemispherical halves or half-sections 8 and 10 suitably joined together. The exterior surfaces of either one or both sections are, in accordance with this invention, provided with light reflecting media or material denoted generally as at 12. On one side the bobber or float is provided with an integral outstanding relatively short shank 14 terminating in an eye 16 to which an end of a slack captive and anchoring line 18 is connected. The inner or adjacent end of the captive line is provided with a ring or other equivalent anchor 20 which is suitably anchored on the stake C. The bobber is provided on the diametrically opposite side with a prong or stem 22 which is also integral and therefore a component of the bobber. It is of any appropriate length and it is preferably bifurcated at the outer end as at 24 providing furcations 26 which, in turn, provide resilient grips or fingers. The outer terminal ends of these ends are beveled and converge into V-shape form as denoted at 28 to facilitate applying the gripping fingers to the fishing line in the manner shown. It follows that this attaching device is sometimes referred to as a clothesline-type clip.

Assuming that the tackle is rigged up on the shore or bank as depicted in FIG. 1 the anchor wing or equivalent retainer 20 is connected to the stake C and the rod is angled into its held position by way of the fork D. However and before doing this the attaching and retaining clip, the means 24 and 26 in particular is releasably connected to the fishing line B just a reasonably short distance below the tip of the fishing rod. Thus the float or bobber is now suspended within the range of the flood of light from the bank, assuming that a night fishing expedition is being carried on. It follows that the light rays from the reflecting surfaces constitute a source of attraction to nearby fish as does the light on the bank. The scintillating and reflective properties not only serve the fish but the fisherman too. That is to say, when the hook (not shown) has been taken and the rod is yanked from its support in the manner shown in FIG. 2 the uplifting force disconnects the fishing line from the clip. Hence, the bobber drops down into the water in the position seen in FIG. 2. Consenquently it can be plainly seen, even at night, and the captive line 18 can be conveniently used to retrieve it and to set it for the next cast of the line.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly, all suitable modifications and equivalents may be resorted to, falling within the scope of the invention as claimed.

What is claimed as new is as follows:

For use in conjunction with an unattended elevated stake on a shore and a rod with fishing line removably and accessibly supported by said stake, a bite signal for night fishing capable of being attached to the fishing line within the range of a lighted off-shore lantern or other source of illumination supported on the shore comprising a buoyant bobber having colorful exterior surfaces, at least one surface being coated with light ray reflecting material, said bobber being provided on one side with an outstanding axially disposed shank terminating in an attaching eye for an anchoring line and being provided on a diametrically opposite side with an outstanding rigidly attached prong, the outer end of the prong having a V-shaped seat, said outer end portion being bifurcated and defining a pair of resilient line gripping fingers, said thus-constructed prong providing a clip and said clip being releasably connectible with said fishing line, and a captive and temporary anchoring line separate from the fishing line comprising a relatively short line, an outer end of which is attached to said attaching eye, the inner end of said anchoring line being provided with an anchoring ring which may be removably attached to said stake.

References Cited in the file of this patent

UNITED STATES PATENTS

| | | |
|---|---|---|
| 2,518,634 | Peterson | Aug. 15, 1950 |
| 2,545,185 | Winslow | Mar. 13, 1951 |
| 2,547,308 | Dean | Apr. 3, 1951 |
| 2,597,288 | Caldwell | May 20, 1952 |
| 2,749,649 | Fitzsimmons | June 12, 1956 |
| 2,858,637 | Stark | Nov. 4, 1958 |
| 2,895,255 | Irwin | July 21, 1959 |